(12) United States Patent  (10) Patent No.: US 7,656,488 B2
Kazuyoshi et al.  (45) Date of Patent: Feb. 2, 2010

(54) LIQUID CRYSTAL DISPLAY DEVICE

(75) Inventors: Nagayama Kazuyoshi, Kanagawa-ken (JP); Yuichi Momoi, Kanagawa-ken (JP)

(73) Assignee: LG. Display Co., Ltd., Seoul (KR)

( * ) Notice: Subject to any disclaimer, the term of this patent is extended or adjusted under 35 U.S.C. 154(b) by 398 days.

(21) Appl. No.: 11/647,500

(22) Filed: Dec. 27, 2006

(65) Prior Publication Data

US 2007/0165173 A1 Jul. 19, 2007

(30) Foreign Application Priority Data

Dec. 28, 2005 (JP) .......................... P 2005-379699

(51) Int. Cl.
G02F 1/1337 (2006.01)
G02F 1/1335 (2006.01)
(52) U.S. Cl. .................. 349/129; 349/106; 349/130
(58) Field of Classification Search ................. 349/129
See application file for complete search history.

(56) References Cited

U.S. PATENT DOCUMENTS

| 5,162,933 | A | 11/1992 | Kakuda et al. |
| 5,317,433 | A | 5/1994 | Miyawaki et al. |
| 5,339,181 | A | 8/1994 | Kim et al. |
| 5,462,887 | A | 10/1995 | Gluck |
| 5,668,379 | A | 9/1997 | Ono et al. |
| 5,731,856 | A | 3/1998 | Kim et al. |
| 5,771,083 | A | 6/1998 | Fujihara et al. |
| 5,793,460 | A | 8/1998 | Yang |
| 5,847,781 | A | 12/1998 | Ono et al. |
| 2004/0207794 | A1* | 10/2004 | Miyachi et al. ............. 349/143 |
| 2004/0246423 | A1* | 12/2004 | Sasabayashi et al. ........ 349/130 |
| 2007/0146610 | A1* | 6/2007 | Momoi et al. ............... 349/144 |
| 2007/0153200 | A1* | 7/2007 | Kazuyoshi .................. 349/141 |
| 2007/0165168 | A1* | 7/2007 | Kazuyoshi .................. 349/130 |
| 2007/0200989 | A1* | 8/2007 | Shinichi et al. ............. 349/129 |

FOREIGN PATENT DOCUMENTS

JP 5-72529 3/1993

* cited by examiner

*Primary Examiner*—Uyen-Chau N Le
*Assistant Examiner*—John M Bedtelyon
(74) *Attorney, Agent, or Firm*—Brinks Hofer Gilson & Lione (57) ABSTRACT

An LCD device includes liquid crystal molecules of n-type liquid crystal, and a viewing-angle control pixel controlling n-type liquid crystal in a pixel. The liquid crystal molecules are inclined in vertical and horizontal directions. The liquid crystal display device may control a viewing angle in vertical and horizontal directions without forming a white sub-pixel.

12 Claims, 11 Drawing Sheets

☒ Common electrode

☐ Pixel electrode

FIG. 3B

☒ Common electrode

☐ Pixel electrode

When no voltage is applied

FIG. 7B
Related Art

When voltage is applied

FIG. 8A
Related Art

When no voltage is applied

FIG. 8B
Related Art

When voltage is applied

Case of black pixel

FIG.12B
Related Art

Case of white pixel

LIQUID CRYSTAL DISPLAY DEVICE

PRIORITY CLAIM

This application claims the benefit of the Japanese Patent Application No. P2005-379699, filed on Dec. 28, 2005, which is hereby incorporated by reference in its entirety.

BACKGROUND

1. Technical Field

The present invention relates to a liquid crystal display (LCD) device and in particular, an LCD device which controls a viewing angle.

2. Related Art

LCD devices, especially, LCD devices adopting thin film transistors (TFT) are widely used in various applications such as mobile phones, large-sized televisions, a personal display device, etc. A user may desire to keep other users from viewing a display screen of a personal display device ("a secret mode"). In other cases, a user may desire to share a display screen with a large number of users ("a wide view angle mode").

Figure 6:
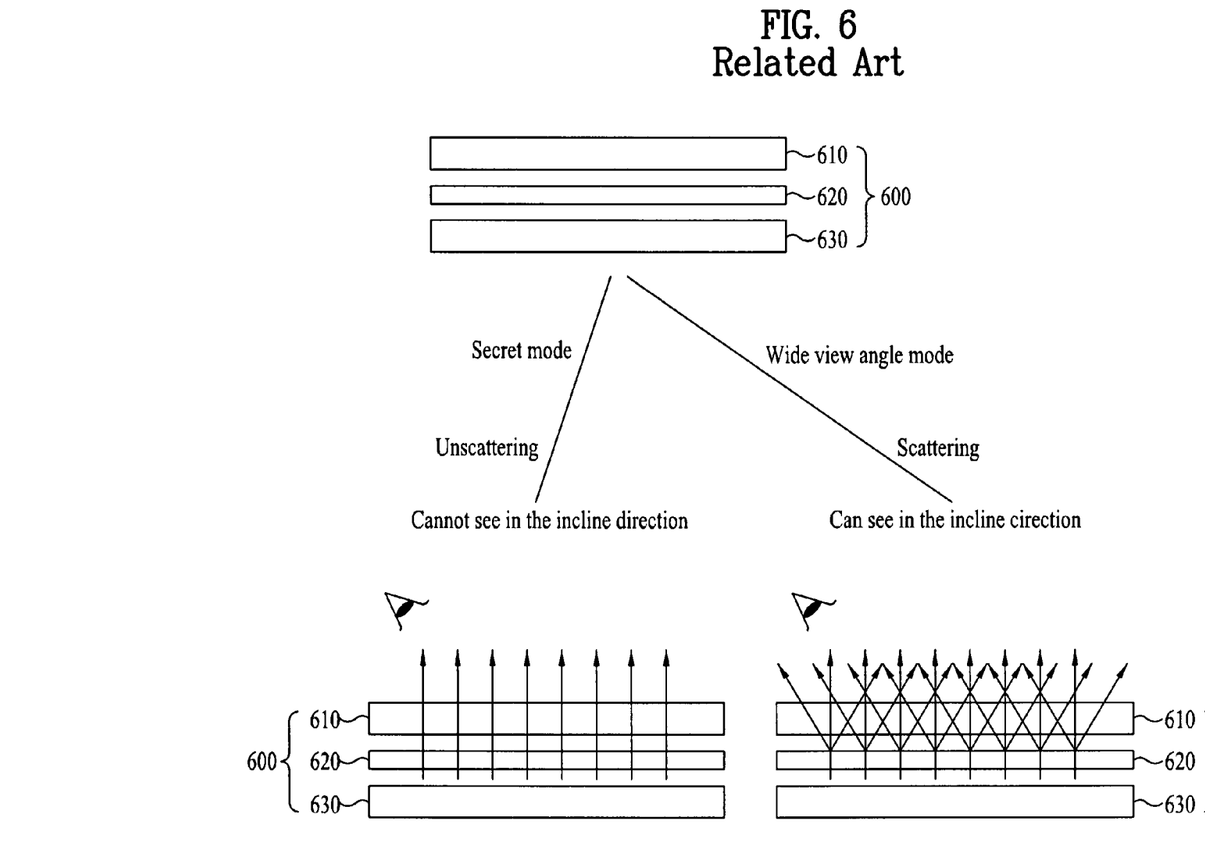
FIG. 6 illustrates a related art LCD device having a secret mode and a wide view angle mode.
Figure 7A:
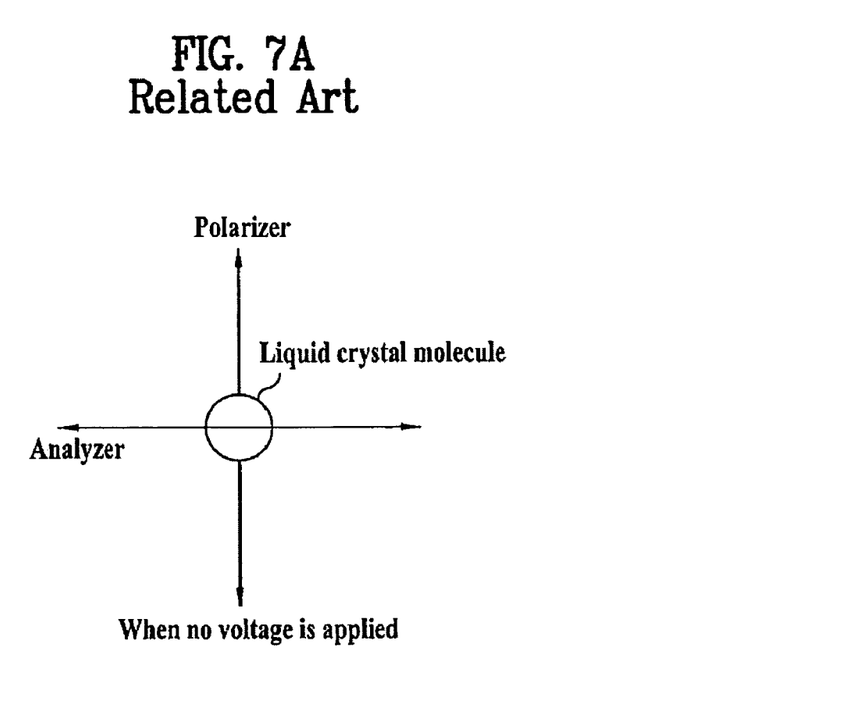
FIG. 7 illustrates the shape of a liquid crystal molecule when viewing a vertical alignment type LCD device from front in the related art.
Figure 7B:
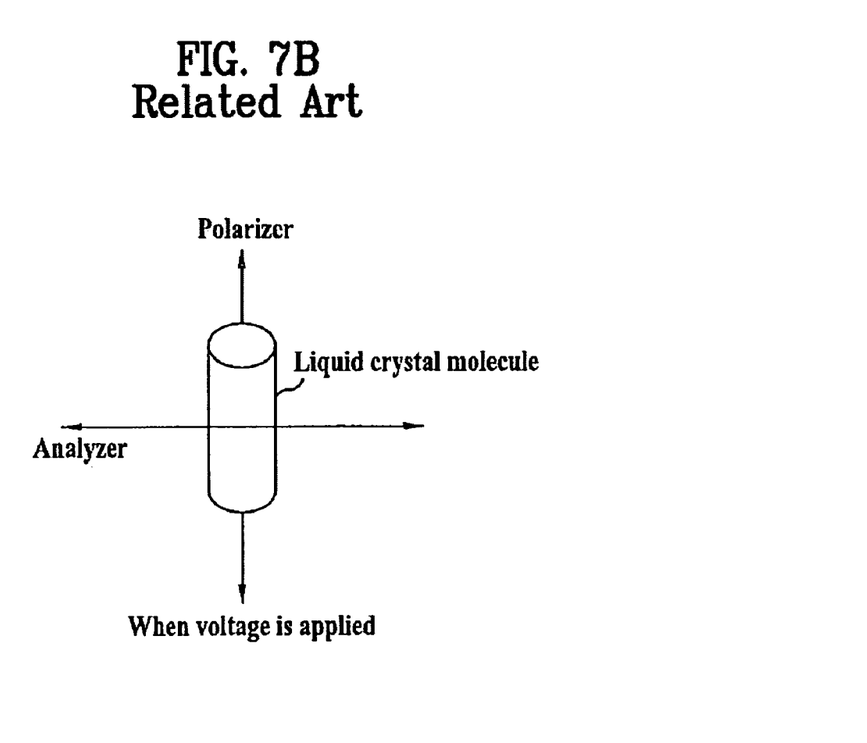

FIG. 6 illustrates a related art LCD device 600 having a secret mode and a wide view angle mode. In FIG. 6, a backlight 630 emits light to the rear surface of a liquid crystal display panel 610. The backlight 630 has high directivity. Between the common liquid crystal display panel 610 and the backlight 630 having the high directivity, a liquid crystal display layer 620 is disposed. The LCD layer 620 operates to switch between a scattered state and an unscattered state. The LCD layer 620 is, for example, a polymer dispersed liquid crystal display layer (a scattering-unscattering switching layer).

When the LCD layer 620 is in an unscattered state, the light emitted from the backlight 630 proceeds only from rear to front, as shown in FIG. 6. If other users are positioned at the side of the liquid crystal display panel 610, the displayed image may not be viewable at the side. On the other hand, if the LCD layer 620 is in a scattered state, the light emitted from the backlight 630 proceeds to the side directions as well as the front direction, as shown in FIG. 6. The displayed image may be viewable at the side and shared by a large number of users. However, expenses for manufacturing the LCD device 600 may increase because of the LCD layer 620.

FIGS. 7-10 illustrate a vertical alignment type liquid crystal display device in the related art. A polarizer has its axis directed in the vertical direction, and an analyzer has its axis directed in the horizontal direction, as shown in FIGS. 7A and 7B. FIGS. 7A and 7B show the shape of liquid crystal molecule which is viewed from front. In FIG. 7A, no voltage is applied and the liquid crystal molecule is aligned vertically. As the birefringence of the liquid crystal molecule does not occur, no light is transmitted. When the voltage is applied to the liquid crystal display panel as shown in FIG. 7B, the liquid crystal molecule is inclined upward. The optical axis of the liquid crystal molecule is in parallel with the absorption axis of the polarizer. Also, double refraction of the liquid crystal molecule does not occur and any light is not transmitted.

Figure 8A:
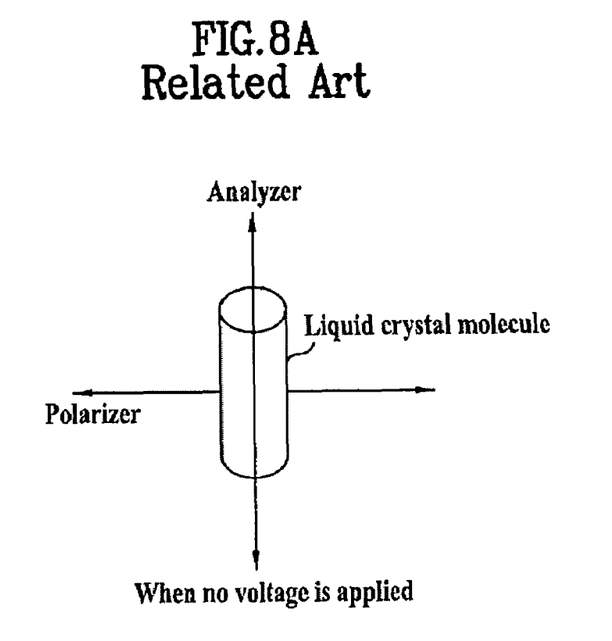
FIG. 8 illustrates the shape of a liquid crystal molecule when viewing a vertical alignment type LCD device from side by a predetermined angle relative to the front of the LCD device in the related art.
Figure 8B:
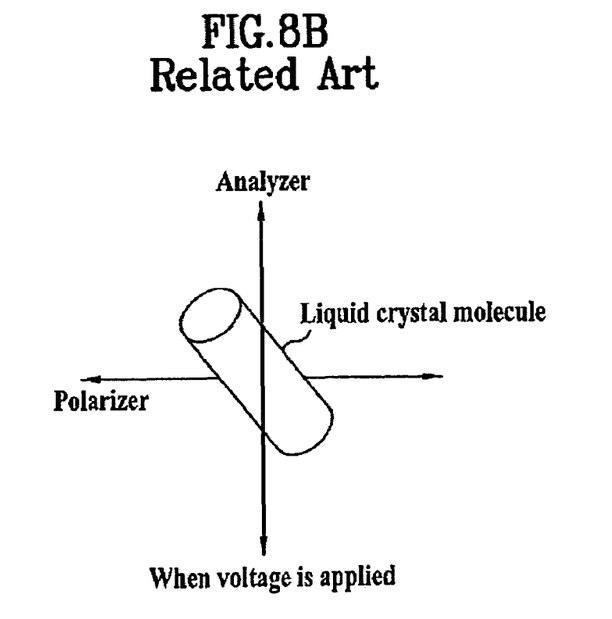

FIG. 8A illustrates the shape of a liquid crystal molecule which is viewed from the side at an angle and FIG. 8B illustrates the shape of a liquid crystal molecule which is viewed from the front of a vertical alignment LCD device. In FIG. 8A, no voltage is applied and the axis of the liquid crystal molecule is in parallel with the absorption axis of the analyzer. No light is transmitted. On the other hand, the voltage is applied in FIG. 8B and the axis of the liquid crystal molecule is offset from the axis of the polarizer or the axis of the analyzer. Consequently, birefringence of the liquid crystal molecule occurs and light is transmitted.

Figure 9:
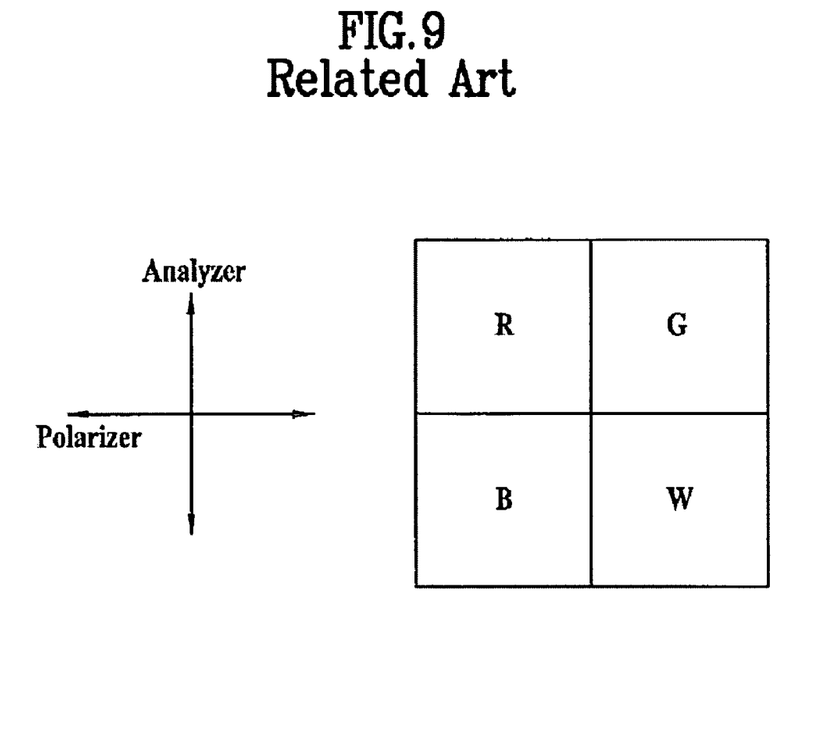
FIG. 9 illustrates a detailed structure to control confidentiality of a display.
Figure 10:
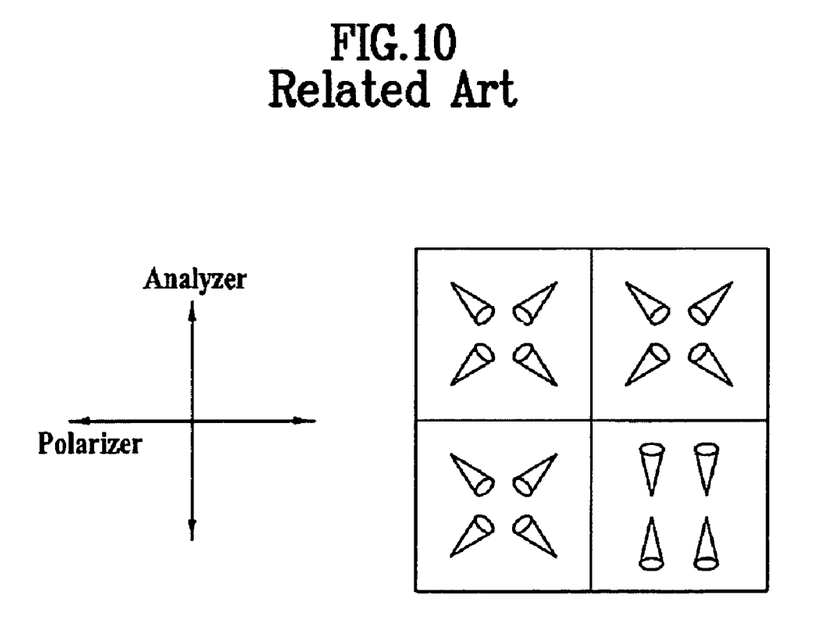
FIG. 10 illustrates arrangements of liquid crystal molecules in each sub-pixel.

Light leakage phenomenon may substantially lower display contrast in the horizontal direction. As a result, data may not be recognizable when the display is viewed in the horizontal direction. Confidentiality of the display may be obtained using this light leakage phenomenon. FIG. 9 illustrates specific construction for controlling confidentiality of the display. In FIG. 9, a single pixel includes sub-pixels of red, green and blue (RGB) and a sub-pixel of white (W). FIG. 10 illustrates an arrangement of liquid crystal molecules of the respective sub-pixels shown in FIG. 9. As shown in FIG. 10, the alignment of the liquid crystal molecules in the white sub-pixel is different from those of the liquid crystal molecules in the RGB sub-pixels. Specifically, the liquid crystal molecules are aligned upward and downward in the white sub-pixel. Consequently, when no voltage is applied to the white sub-pixel, the white sub-pixel does not contribute to the display. Accordingly, a normal display may be realized. When the voltage is applied to the white sub-pixel, the white display appears in the horizontal direction. The contrast of the display is lowered in the horizontal viewing angle alignment. Accordingly, it is difficult for other people to view the displayed image.

Figure 11:
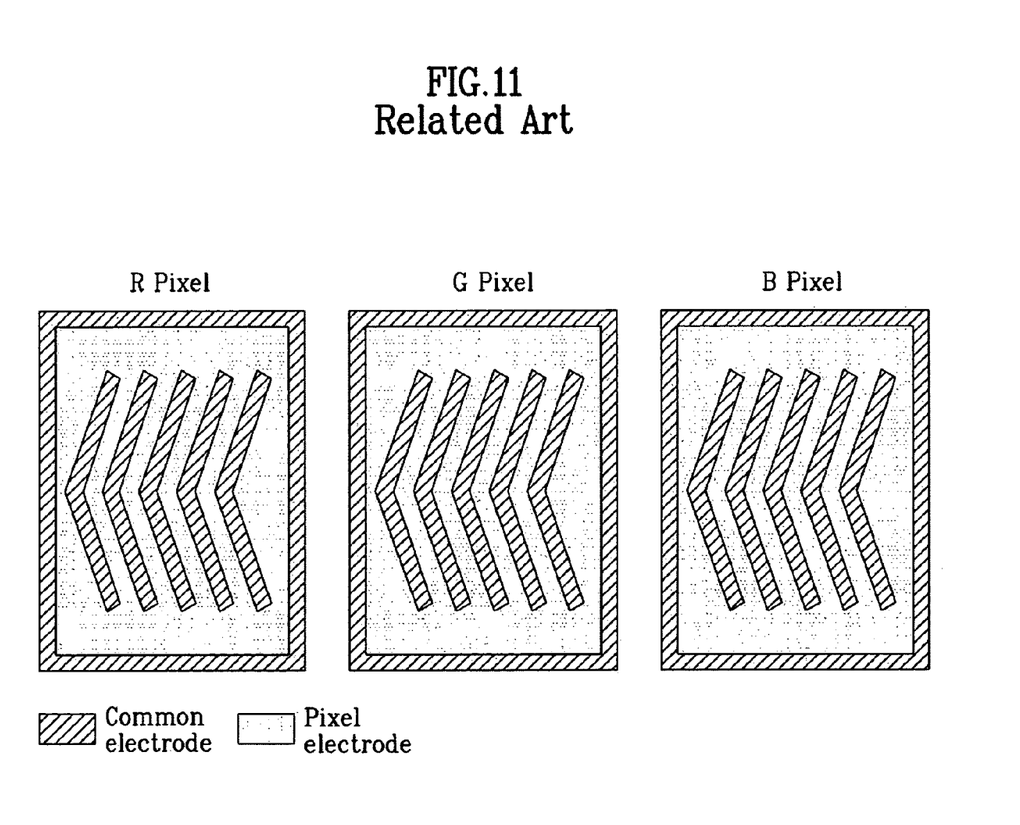
FIG. 11 is a plan view illustrating adjacent pixels in a related art FFS mode LCD device.

Another related art LCD device is a fringe field switching (FFS) mode LCD device, which includes a common electrode in shape of "<" to improve a viewing angle. FIG. 11 is a plan view illustrating each of RGB pixels for a related art FFS mode LCD device. FIG. 12 illustrates operations of liquid crystal molecules as a voltage is applied to the related art FFS mode LCD device. As shown in FIG. 11, the related art FFS mode LCD device includes a common electrode which is formed in shape of "<" to regulate the inclination direction of liquid crystal.

Figure 12A:
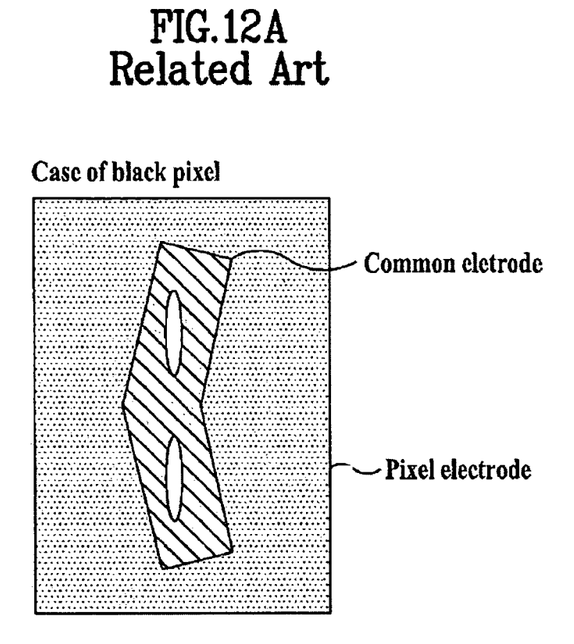
FIG. 12 illustrates operations of liquid crystal molecules based on the application of voltage in a related art FFS mode LCD device.
Figure 12B:
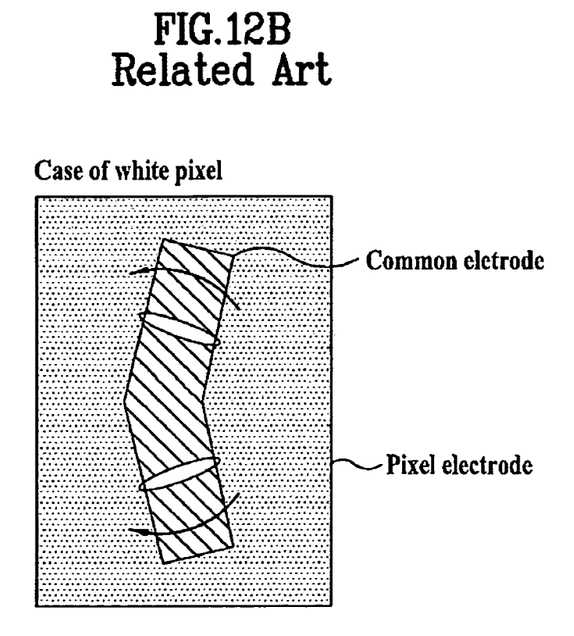

As shown in FIG. 12A, when no voltage is applied to the LCD device, the liquid crystal molecules are aligned in the vertical direction. If a voltage is applied to the LCD device, the liquid crystal molecules are inclined in the predetermined direction. The inclined direction is determined based on the effect of the inclined electric field applied to the common electrode, i.e., the direction perpendicular to the extending direction of the common electrode, as shown in FIG. 12B. As a result, the liquid crystal molecules are inclined in the two directions corresponding to the "<" shape. The LCD device may have a good viewing angle. However, the LCD devices may not obtain confidentiality of the display upon need. Therefore, there is a need of an LCD device that overcomes drawbacks of the related art LCD devices.

SUMMARY

Accordingly, the present invention is directed to an FFS mode LCD device, which substantially obviates one or more problems due to limitations and disadvantages of the related art. In one embodiment, a liquid crystal display device includes liquid crystal molecules of n-type liquid crystal and a viewing-angle control pixel. The viewing-angle control pixel controls the n-type liquid crystal in a pixel to have the liquid crystal molecules inclined in vertical and horizontal directions.

In other embodiment, a liquid crystal display device includes a plurality of RGB pixels and a plurality of control pixels. The RGB pixels have liquid crystal molecules which change an alignment in response to application of a voltage. The RGB pixels display information based on the changed alignment. The control pixels are operable to change the display of the information upon application of the voltage.

In another embodiment, a method for fabricating of a liquid crystal display device is provided. Liquid crystal molecules of n-type liquid crystal are formed. A viewing-angle control pixel controlling the n-type liquid crystal in a pixel is formed. The liquid crystal molecules are arranged to be inclined in vertical and horizontal directions.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
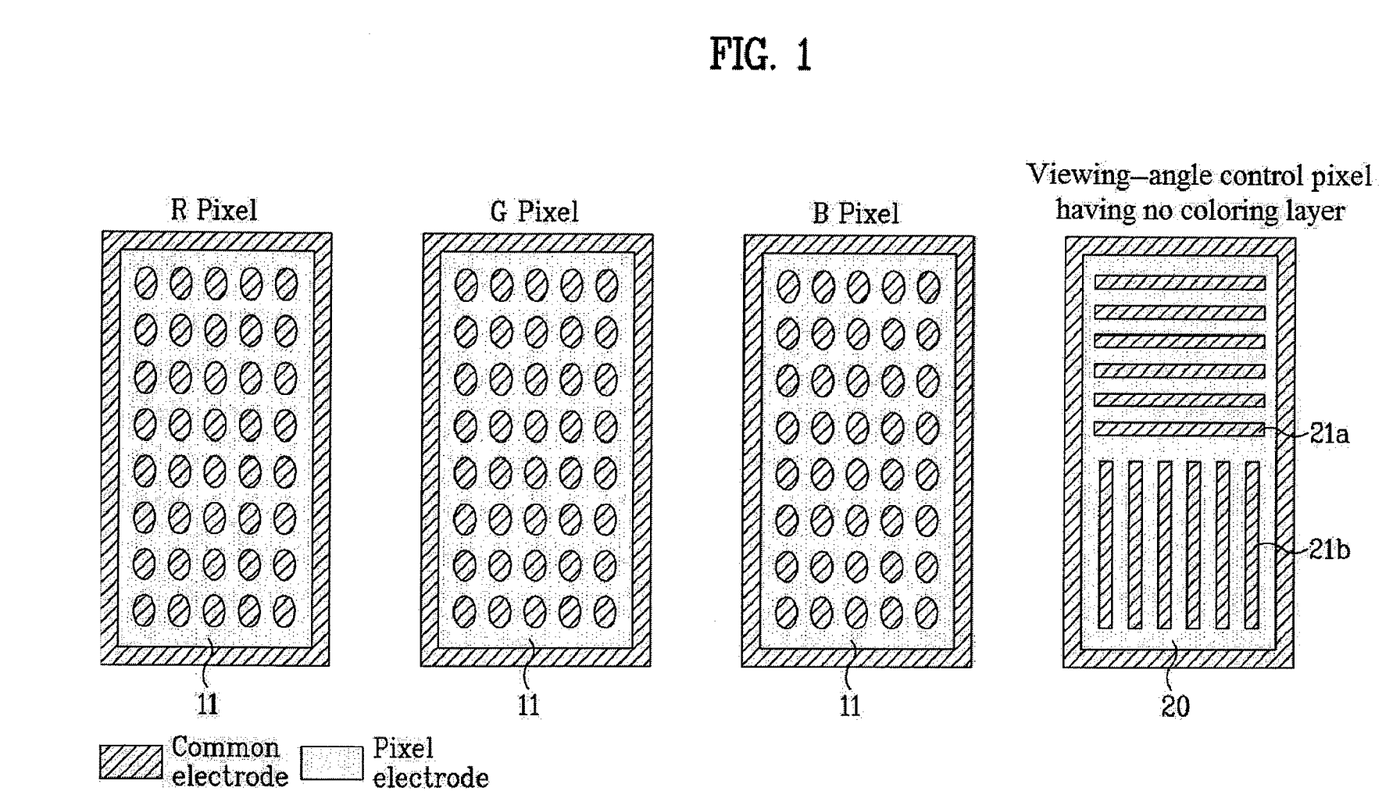
FIG. 1 is a plan view illustrating each of RGB pixels in an LCD device according to a first embodiment.

FIG. 1 is a plan view illustrating each of RGB pixels in an LCD device according to a first embodiment. The LCD device is an FFS mode LCD device. As shown in FIG. 1, each of R, G and B pixels is provided with a pixel electrode 11 and a common electrode. The pixel electrode 11 includes circular or elliptical pixel holes. In FIG. 1, the pixel electrode 11 includes the circular pixel holes, whereby the common electrode is exposed through the circular pixel holes. Accordingly, liquid crystal molecules of n-type liquid crystal are inclined to various directions.

In addition to the RGB pixels, the LCD device according to the first embodiment further includes a viewing-angle control pixel 20 which controls the viewing angle. The viewing-angle control pixel 20 is controlled such that the liquid crystal molecules of n-type liquid crystal are inclined in the horizontal (left and right) and vertical (up and down) directions. In this case, a control voltage is applied to the viewing-angle control pixel 20 through another viewing-angle control line (not shown).

The viewing-angle control pixel 20 is provided with a first region and a second region. The first region includes the common electrode 21a formed in the horizontal (left and right) direction and the second region includes the common electrode 21b formed in the vertical (up and down) direction. The viewing-angle control pixel 20 also includes a pixel electrode 11 which is provided with pixel holes to expose the common electrode 21a in the horizontal (left and right) direction and the common electrode 21b in the vertical (up and down) direction.

The above-mentioned LCD device is provided with the n-type liquid crystal. In this case, the common electrodes 21a and 21b may be formed in one viewing-angle control pixel 20 without a mask-rubbing process, as shown in FIG. 1. As a result, the control voltage is applied to the viewing-angle control pixel 20 through the viewing-angle control line, and the liquid crystal molecules are inclined in the horizontal and vertical (front, rear, left and right) directions. Accordingly, the viewing angle is controlled.

As shown in FIG. 1, the viewing-angle control pixel 20 is supplied with the control voltage through the additional viewing-angle control line. The viewing-angle control line is separated from a power-supplying line for the RGB pixels. The viewing-angle control line for the viewing-angle control pixel 20 corresponds to a separate common line. The viewing-angle control line for the viewing-angle control pixel 20 is formed of a transparent electrode, which may result in an improved aperture ratio. The common line is also formed separately, so that it is possible to apply a voltage having a predetermined wavelength to the viewing-angle control pixel 20.

Figure 2:
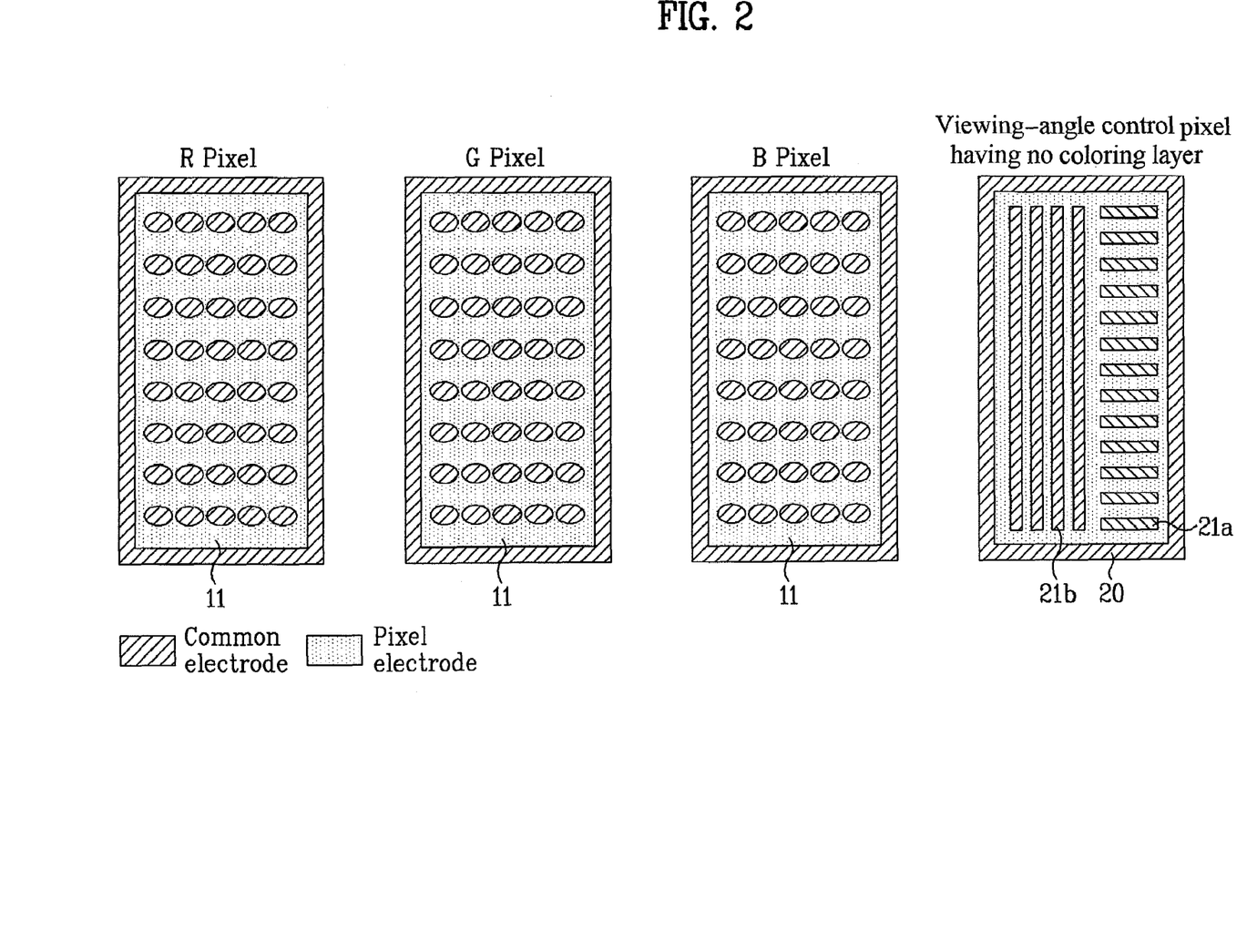
FIG. 2 is a plan view illustrating each of RGB pixels in an LCD device according to a second embodiment.

FIG. 2 is a plan view illustrating RGB pixels of an LCD device according to a second embodiment. In FIG. 2, common electrodes 21a and 21b are arranged in a viewing-angle control pixel 20. The arrangement structure of the common electrodes 21a and 21b of FIG. 2 is different from that of the common electrodes of FIG. 1.

Referring to FIGS. 1 and 2, the common electrodes 21a and 21b may be arranged both in the vertical and horizontal directions within the viewing-angle control pixel 20. The viewing-angle control pixel 20 may not directly contribute to the display. The viewing-angle control pixel 20 may be arranged to make it difficult to recognize the display information. Consequently, a coloring layer may not be formed in a color filter substrate opposite to the viewing-angle control pixel 20.

Figure 3A:
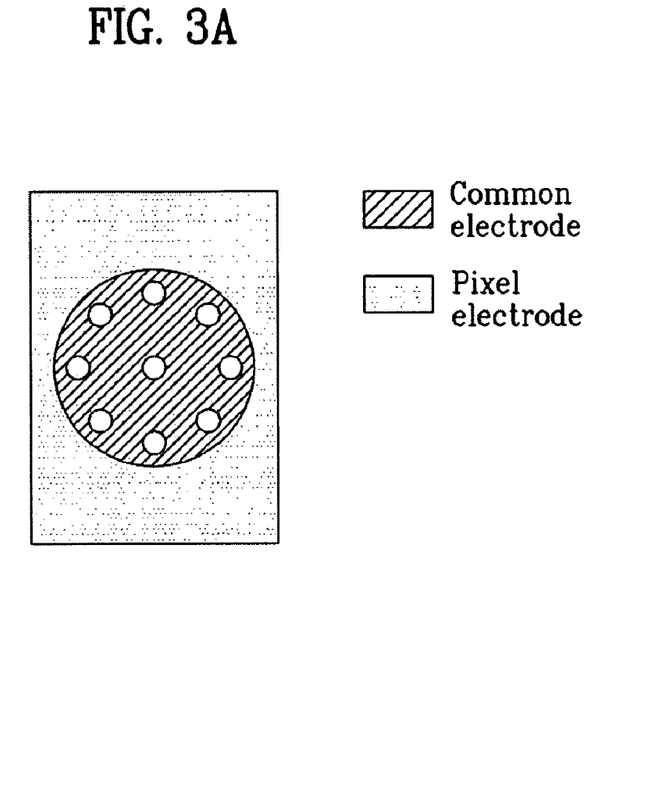
FIGS. 3A and 3B illustrate operations of liquid crystal molecules in RGB pixels having a circular-shaped pixel electrode according to the first and second embodiments.
Figure 3B:
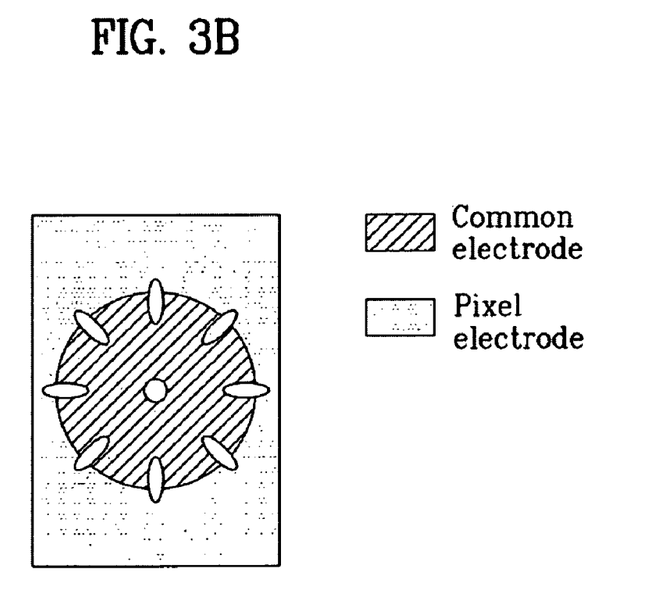

An operation of the liquid crystal molecules in each of the RGB pixels depending on application of a voltage will be explained as follows. FIGS. 3A and 3B illustrate operations of liquid crystal molecules in RGB pixels having a circular-shaped pixel electrode according to the first and second embodiments.

As shown in FIG. 3A, when no voltage is applied to the LCD device, the liquid crystal molecules are aligned vertically. Accordingly, the pixel is displayed in black from front and side portions. Upon application of the voltage to the LCD device, as shown in FIG. 3B, the liquid crystal molecules are inclined in the predetermined direction. The inclination direction is determined due to the effect of the inclined electric field applied to the pixel electrode 11 having the circular-shaped pixel hole. The direction is perpendicular to the outer circumference of the pixel electrode 11 including the circular-shaped pixel hole. As a result, white display may be viewed from front and side portions, e.g. all directions of 360 degrees.

Each of the RGB pixels includes the pixel electrode 11 provided with the circular-shaped pixel hole. In addition, a bright display may be realized from all viewing directions by applying the voltage to the desired pixel. Thus, each of the RGB pixels may represent the color display by obtaining the visibility from 360 degrees of the front and side portions.

Figure 4A:
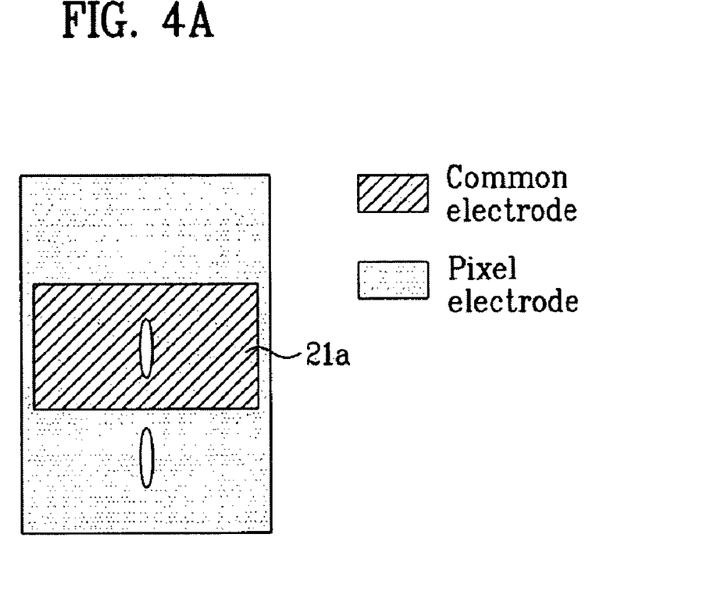
FIGS. 4A and 4B illustrate operations of liquid crystal molecules in a viewing-angle control pixel having a common electrode in a horizontal direction according to the first and second embodiments.
Figure 4B:
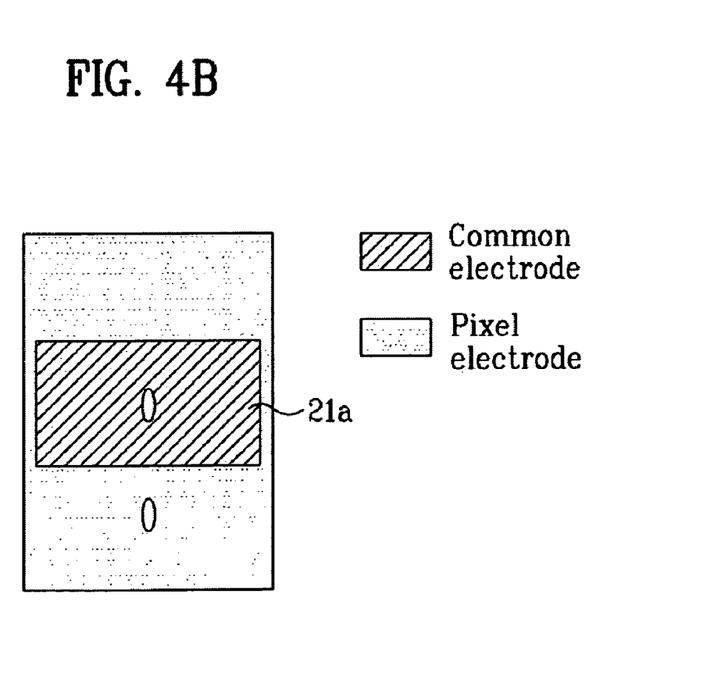

An operation of the liquid crystal molecules in the viewing-angle control pixel 20 depending on application of the voltage will be explained as follows. FIGS. 4A and 4B illustrate operations of liquid crystal molecules in the viewing-angle control pixel having the common electrode in the horizontal (left and right) direction according to the first and second embodiments. When no voltage is applied to the viewing-angle control pixel 20 having the common electrode 21a in the horizontal (left and right) direction, as shown in FIG. 4B, the liquid crystal molecules are in the vertical state. As a result, the display of the viewing-angle control pixel 20 becomes black, and the whole display is not affected. This is identical in the front viewing angle, the vertical (up and down) and horizontal (left and right) viewing angles, and the inclined viewing angle. All of the display is normally used.

When the voltage is applied to the viewing-angle control pixel 20 having the common electrode 21a in the horizontal (left and right) direction, as shown in FIG. 4A, the liquid crystal molecules stand vertically in the central portion between each of the common electrodes 21a. Consequently, when the viewing-angle control pixel 20 is viewed in the horizontal (left and right) direction, the bright light is transmitted through the common electrode 21a of the horizontal (left and right) direction where the liquid crystal molecules stand vertically. On the other hand, when the viewing-angle control pixel 20 is viewed in the vertical (up and down) direction, the light is not transmitted through the common electrode 21a of the horizontal (left and right) direction where the liquid crystal molecules stand vertically.

When the voltage is applied to the viewing-angle control pixel 20 having the common electrode 21b of the vertical (up and down) direction, the liquid crystal molecules stand vertically in the direction which is different by 90 degrees from the direction shown in FIG. 4A, in the central portion of the common electrode 21b. Consequently, when the viewing-angle control pixel 20 is viewed only in the horizontal (left and right)-direction, the light is not transmitted through the common electrode 21b of the vertical (up and down) direction where the liquid crystal molecules stand. On the other hand, when viewing in the vertical (up and down) direction, the bright light is transmitted through the common electrode 21b of the vertical (up and down) direction where the liquid crystal molecules stand.

As a result, at the viewing angle from the horizontal (left and right) direction upon application of the voltage to the viewing-angle control pixel 20, the viewing-angle control area having the common electrode 21a of the horizontal (left and right) direction is recognized as the white, and the viewing-angle control area having the common electrode 21b of the vertical (up and down) direction is recognized as the black. At the viewing angle from the vertical (up and down) direction, the viewing-angle control area having the common electrode 21a of the horizontal (left and right) direction is recognized as the black, and the viewing-angle control area having the common electrode 21b of the vertical (up and down) direction is recognized as the white.

These patterns are overlapped with the common display pattern of the RGB pixels. Consequently, when the patterns are viewed in the horizontal (left and right) direction and the vertical (up and down) direction, the displayed information may not be recognizable and confidentiality of displayed information may be obtained. As described above, the viewing-angle control pixel 20 corresponding to each of the RGB pixels includes both the common electrode 21a of the horizontal (left and right) direction and the common electrode 21b of the vertical (up and down) direction. Thus, it may brighten the display in the horizontal (left and right) or vertical (up and down) viewing direction by applying the voltage to the viewing-angle control pixel 20. The display of the desired confidentiality from the side direction may be obtained except the front direction.

Figure 5:
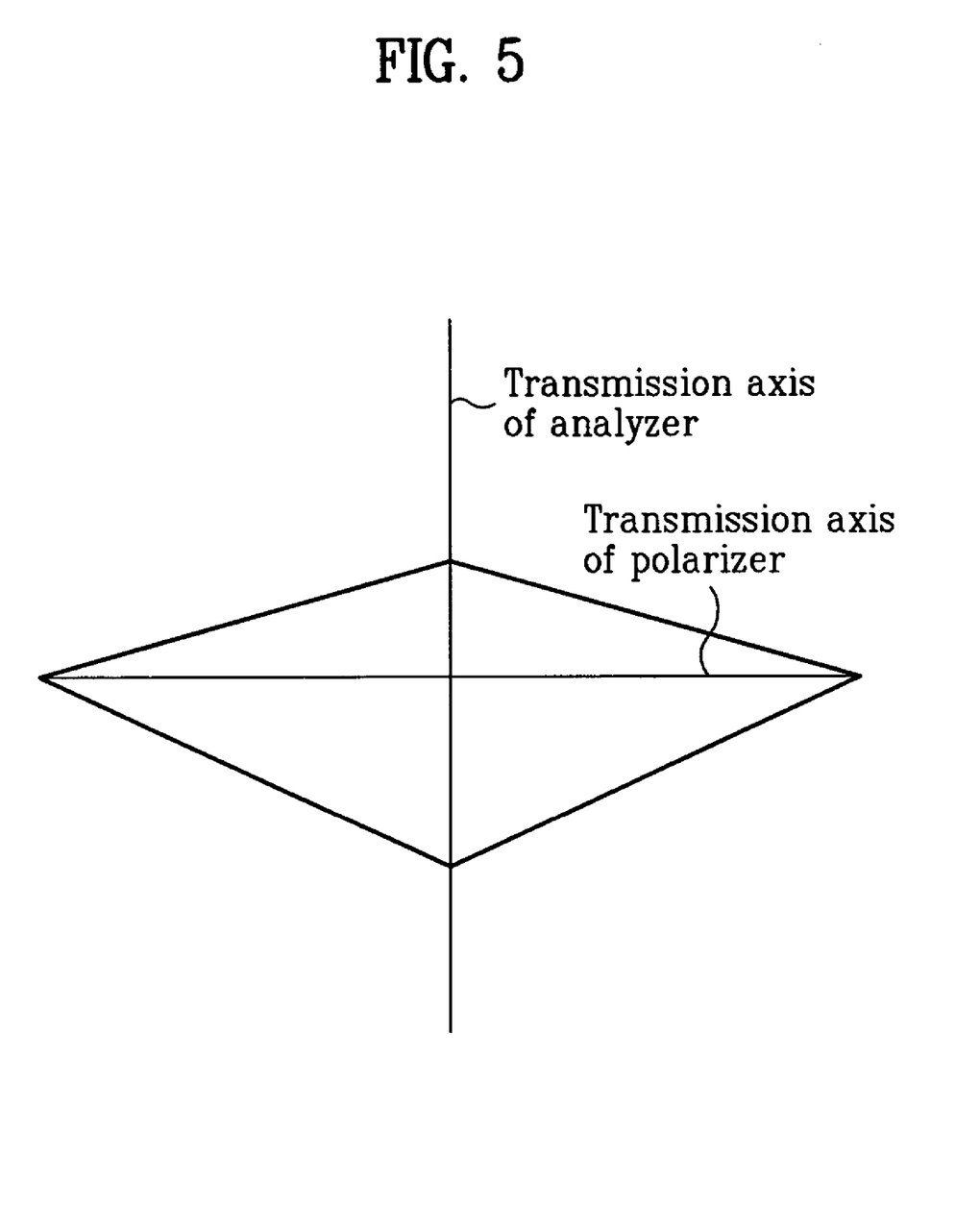
FIG. 5 illustrates luminance distribution of viewing-angle dependency based on the application of voltage in a viewing-angle control pixel according to the first and second embodiment.

FIG. 5 illustrates luminance distribution of viewing-angle dependency based on the application of voltage in the viewing-angle control pixel according to the first and second embodiments of FIGS. 1 and 2. When no voltage is applied to the viewing-angle control pixel 20, the luminance of the inclined direction corresponds to the black screen in the front and side directions from up, down, left, and right. When the voltage is applied to the viewing-angle control pixel 20, the front is in the black, and the light is transmitted to the side directions from up, down, left, and right. As a result, the light is transmitted to the side directions in the horizontal line. A user positioned at the side direction of the device may not recognize the image displayed on the panel. Accordingly, confidentiality of displayed information may be obtained. In the n-type liquid crystal, the pixel electrode 11 including the circular-shaped pixel hole is provided to improve the visibility in all directions. Furthermore, the viewing-angle control pixel 20 is formed in the device and the confidentiality of information may be obtained from the side directions.

In the above-mentioned preferred embodiment, the viewing-angle control pixel may be separately formed from the RGB pixels, and the pixel electrode including the circular-shaped pixel hole is provided from the n-type liquid crystal. Thus, the LCD device may control the viewing angle from the side direction except the front direction and also may improve visibility from all the directions.

Furthermore, the common electrodes of the horizontal (left and right) and vertical (up and down) directions are formed together in the same viewing-angle control pixel. As a result, each of the RGB pixels may obtain the confidentiality for the displayed information in the vertical and horizontal directions. The color filter substrate opposite to the viewing-angle control region has no coloring layer which may lower fabrication expenses.

As mentioned above, the LCD device includes the viewing-angle control pixel which is controlled to have the liquid crystal molecules of n-type liquid crystal inclined in the horizontal (left and right) and vertical (up and down) directions based on each of the RGB pixels having the inclined liquid crystal molecules. As a result, the LCD device may control the viewing angle in the horizontal (left and right) and vertical (up and down) directions without forming any additional white pixel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

We claim:

1. A liquid crystal display device, comprising:
   liquid crystal molecules;
   a viewing-angle control pixel controlling the liquid crystal molecules to have the liquid crystal molecules inclined in vertical and horizontal directions and having a pixel electrode including a plurality of first pixel holes arranged in a horizontal direction and a plurality of second pixel holes arranged in a vertical direction; and
   RGB-pixels being separate from the viewing-angle control pixel and having a pixel electrode including a plurality of third pixel holes different shape from the first and second pixel holes,
   wherein no coloring layer is formed in the viewing-angle control pixel.

2. The device of claim 1, wherein each of the RGB-pixels comprises:
   the pixel electrode including the third pixel holes having one of circular shape and elliptical shape; and
   a common electrode exposed through the third pixel holes.

3. The device of claim 2, wherein the viewing-angle control pixel comprises the pixel electrode having the first and second pixel holes and wherein the common electrode is exposed through the first and second pixel holes in the horizontal and vertical directions.

4. A liquid crystal display device, comprising:
   a plurality of RGB pixels having liquid crystal molecules which change an alignment in response to application of a voltage and displaying information based on the changed alignment; and
   a plurality of control pixels operable to change the display of the information upon application of the voltage and being separate from each of the RGB pixels;
   wherein the control pixels have a pixel electrode including a plurality of first pixel holes arranged in a horizontal direction and a plurality of second pixel holes arranged in a vertical direction and the RGB pixels have a pixel electrode including a plurality of third pixel holes different shape from the first and second pixel holes,
   wherein no coloring layer is formed in the viewing-angle control pixel.

5. The device of claim 4, wherein the control pixels comprise liquid crystal molecules which change the alignment upon application of the voltage.

6. The device of claim 5, wherein the display of the information is viewable from a predetermined direction in a first mode and the display of the information is unviewable from the direction in a second mode wherein no voltage is applied to the control pixels in the first mode and voltage is applied to the control pixels in the second mode.

7. The device of claim 4, wherein the display of the information is identical in a front viewing angle, a vertical viewing angle, a horizontal viewing angle and an inclined viewing angle upon application of no voltage.

8. The device of claim 4, wherein a horizontal view of the control pixels is different from a vertical view of the control pixels upon application of the voltage.

9. A method for fabricating of a liquid crystal display device, comprising:
   forming liquid crystal molecules;
   forming a viewing-angle control pixel controlling the liquid crystal molecules to have the liquid crystal molecules inclined in vertical and horizontal directions and having a pixel electrode including a plurality of first pixel holes arranged in a horizontal direction and a plurality of second pixel holes arranged in a vertical direction;
   forming RGB-pixels being separate from the viewing-angle control pixel and having a pixel electrode including a plurality of third pixel holes different shape from the first and second pixel holes,
   arranging the liquid crystal molecules to be inclined in vertical and horizontal directions,
   wherein no coloring layer is formed in the viewing-angle control pixel.

10. The method of claim 9, wherein forming the viewing-angle control pixel and the RGB pixels further comprise:
    forming the pixel electrode having the first and second pixel holes in the RGB pixels and the pixel electrode having the third pixel holes in the viewing-angle control pixel; and
    forming a common electrode exposed through the first pixel holes, the second pixel holes, and the third pixel holes.

11. The method of claim 10, wherein the forming the pixel electrode comprises forming the third pixel holes to have one of circular shape and elliptical shape.

12. The method of claim 10, wherein the forming the pixel electrode having the first and second pixel hole which expose the common electrodes in the horizontal and vertical directions.

* * * * *

UNITED STATES PATENT AND TRADEMARK OFFICE
CERTIFICATE OF CORRECTION

PATENT NO.       : 7,656,488 B2                                    Page 1 of 1
APPLICATION NO. : 11/647500
DATED            : February 2, 2010
INVENTOR(S)      : Kazuyoshi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 435 days.

Signed and Sealed this

Thirtieth Day of November, 2010

David J. Kappos
*Director of the United States Patent and Trademark Office*